United States Patent
Zhang et al.

(10) Patent No.: US 12,001,636 B2
(45) Date of Patent: Jun. 4, 2024

(54) COVER LAYER DETECTION FOR TOUCH INPUT DEVICES

(71) Applicant: Apple Inc., Cupertino, CA (US)

(72) Inventors: Guangtao Zhang, Cupertino, CA (US); Apexit Shah, Sunnyvale, CA (US); Heemin Yang, San Francisco, CA (US); Kevin D. Spratt, Santa Clara, CA (US); Mayank Garg, Santa Clara, CA (US); Nima Ferdosi, San Jose, CA (US); Vikram Garg, San Francisco, CA (US); William J. Esposito, Seattle, WA (US); Tavys Q. Ashcroft, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/361,004

(22) Filed: Jul. 28, 2023

(65) Prior Publication Data

US 2023/0367433 A1  Nov. 16, 2023

Related U.S. Application Data

(63) Continuation of application No. 17/653,439, filed on Mar. 3, 2022, now Pat. No. 11,755,154.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2019/0018527 A1 | 1/2019 | Barel et al. | |
| 2019/0065717 A1* | 2/2019 | Won | G06V 40/1318 |
| 2020/0097124 A1* | 3/2020 | Mutlu | G06F 3/0421 |
| 2020/0201459 A1 | 6/2020 | Withers et al. | |

FOREIGN PATENT DOCUMENTS

CN     110955372 A     4/2020

* cited by examiner

*Primary Examiner* — Stephen T. Reed
(74) *Attorney, Agent, or Firm* — Dorsey & Whitney LLP

(57) ABSTRACT

Computing devices and methods are used to detect and compensate for the presence of a cover layer on a touch input device. A computing device includes a processing device, a touch input device in electronic communication with the processing device, and a memory device in electronic communication with the processing device and having electronic instructions encoded thereon. The electronic instructions, when executed by the processing device, cause the processor to receive a first signal obtained from the touch input device over a first duration of time, the first signal including a first signal pattern, receive a second signal obtained from the touch input device over a second duration of time separate from the first duration of time, the second signal including a second signal pattern, determine a difference between the first signal pattern and the second signal pattern, and adjust a touch input detection setting based on the difference.

20 Claims, 8 Drawing Sheets

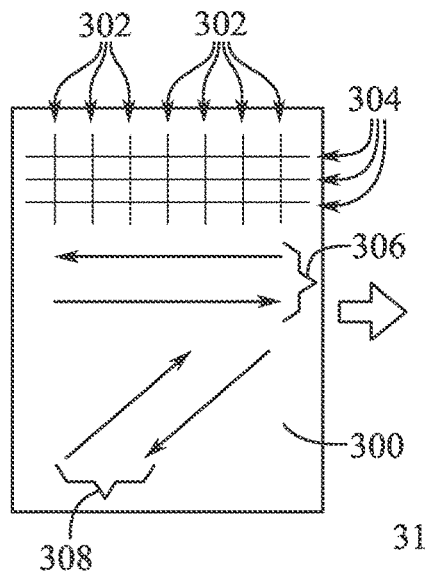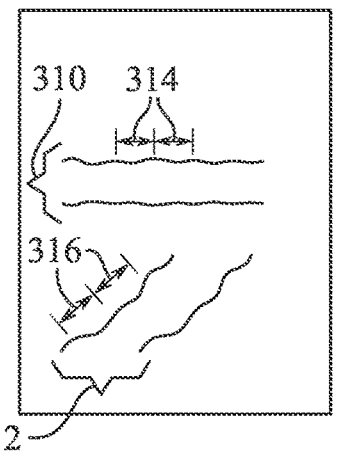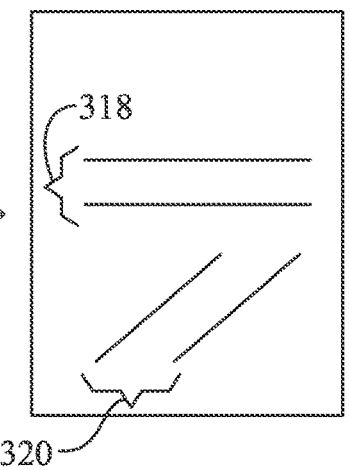
FIG. 3A   FIG. 3B   FIG. 3C
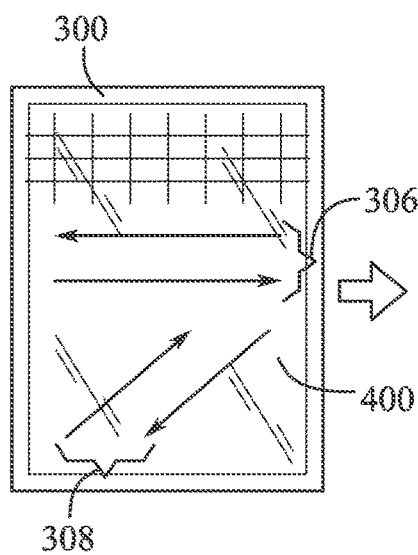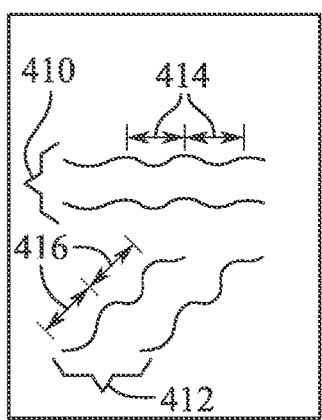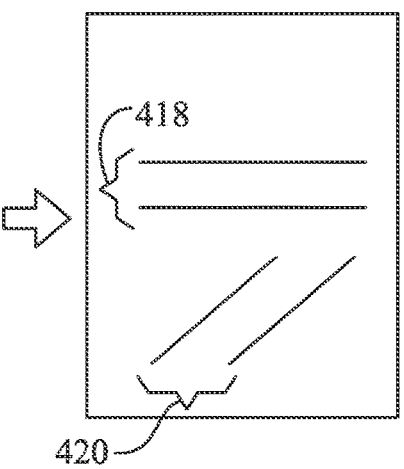
FIG. 4A   FIG. 4B   FIG. 4C

COVER LAYER DETECTION FOR TOUCH INPUT DEVICES

CROSS-REFERENCE TO RELATED APPLICATION(S)

This is a continuation of U.S. patent application Ser. No. 17/653,439, filed 3 Mar. 2022, and entitled "Cover Layer Detection for Touch Input Devices," the entire disclosure of which is hereby incorporated by reference.

FIELD

The described embodiments relate generally to apparatus, methods, and systems for controlling a touch input device. More particularly, the present embodiments relate to detecting a cover layer or screen protector on a touch input device and taking actions to compensate for the changes to the usage of the computing device.

BACKGROUND

With the development of mobile communication technologies, electronic devices, which are often equipped with a display, such as smartphones, wearable devices, tablet computers, laptop or notebook computers, vehicle interfaces, and the like have been widely normalized and integrated into everyday life of millions of users.

A display of the electronic device may be implemented with a touchscreen display. The touchscreen display may perform a role as an input device that receives a manipulation from a user, in addition to a role as a display device. Touchscreen displays are commonly implemented with capacitance sensing capability, wherein electrodes below a cover glass material are used to sense a change in capacitance caused by introduction of a user instrument (e.g., a finger or tool) to the surface of the cover glass.

Although touchscreens provide an engaging interface for users, the cover glass can be fragile and susceptible to cracking or scratching. Additionally, the manufacturer-provided surface finish of the cover glass can be different from a user's preference, such as by being more or less glossy than what the user prefers. Some users also prefer different cover glass textures for using different types of tools on the display. Many users therefore apply a screen protector to the cover glass to improve the durability, appearance, and functional characteristics of the cover glass. Screen protectors generally are made to cause minimal distortion to the images shown by the underlying display screen, but they can alter the light of the display screen in minor but perceptible ways.

Accordingly, there is a constant need for improvements to display screens technology.

SUMMARY

An aspect of the present disclosure relates to a computing device, comprising a processing device in electronic communication with: a first light sensor; a second light sensor; and a touch input device; and a memory device in electronic communication with the processing device and having electronic instructions encoded thereon; wherein the electronic instructions, when executed by the processing device, cause the processor to: receive a first signal from the first light sensor; receive a second signal from the second light sensor; determine a difference between the first signal and the second signal; and adjust a touch input parameter of the touch input device based on the difference between the first signal and the second signal.

In some embodiments, adjusting the touch input parameter comprises decreasing a threshold parameter for detecting a touch input at the touch input device or comprises increasing a threshold parameter for curve-fitting a touch input at the touch input device.

In some embodiments, the electronic instructions further cause the processor to simultaneously obtain the first signal and the second signal from the first light sensor and the second light sensor, respectively.

In some embodiments, the difference between the first signal and the second signal includes a difference in light intensity sensed by the first light sensor relative to the second light sensor.

In some embodiments, the difference between the first signal and the second signal includes a difference in light wavelength sensed by the first light sensor relative to the second light sensor.

In some embodiments, adjusting the touch input detection parameter comprises increasing a sensitivity setting of the touch input device.

In some embodiments, the computing device further comprises a cover positioned on the touch input device and filtering light sensed by the first light sensor differently from light sensed by the second light sensor.

Another aspect of the disclosure relates to a computing device, comprising: a processing device; a touch input device in electronic communication with the processing device; and a memory device in electronic communication with the processing device and having electronic instructions encoded thereon; wherein the electronic instructions, when executed by the processing device, cause the processor to: receive a first signal obtained from the touch input device over a first duration of time, the first signal including a first signal pattern; receive a second signal obtained from the touch input device over a second duration of time separate from the first duration of time, the second signal including a second signal pattern; determine a difference between the first signal pattern and the second signal pattern; and adjust a touch input detection setting based on the difference between the first signal pattern and the second signal pattern.

In some embodiments, the difference between the first signal pattern and the second signal pattern includes a difference in amplitude. The difference between the first signal pattern and the second signal pattern can also include a difference in a peak-to-peak distance or a difference in spatial frequency of a portion of the first signal pattern and a portion of the second signal pattern.

In some embodiments, the touch input device comprises a grid of sensor components having orthogonal primary axes, and wherein the first signal and the second signal are obtained via input provided to the touch input device along a path non-orthogonal to the primary axes of the grid of sensor components.

In some embodiments, adjusting the touch input detection setting includes changing a input interpretation algorithm.

Yet another aspect of the disclosure relates to a computing device, comprising: a processing device; a body having an outer face; a touch input device in electronic communication with the processing device and configured to sense capacitive touch input through the outer face; a sensor in electronic communication with the processing device and configured to sense through the outer face; and a memory device in electronic communication with the processing device and having electronic instructions encoded thereon; wherein the electronic instructions, when executed by the processing device, cause the processor to: receive a first signal obtained from the sensor at a first time, the first signal having a first signal characteristic; receive a second signal obtained from the sensor at a second time separate from the first time, the second signal having a second signal characteristic; detect a difference between the first and second signal characteristics; and adjust a touch input threshold of the touch input device based on the difference between the first and second signal characteristics.

In some embodiments, the sensor includes an audio sensor, a light sensor, and/or a capacitance sensor separate from the touch input device.

In some embodiments, the difference in magnitude includes a reduction of magnitude between the first signal and the second signal in response to a substantially equal stimulus provided to the sensor at the first time and at the second time.

In some embodiments, adjusting the touch input threshold includes increasing sensitivity of the touch input device to detect capacitive touch input.

BRIEF DESCRIPTION OF THE DRAWINGS

The disclosure will be readily understood by the following detailed description in conjunction with the accompanying drawings, wherein like reference numerals designate like structural elements, and in which:

FIG. 3A shows a touch input device and a set of input strokes.

FIG. 3B shows a set of sensed paths based on the input strokes of FIG. 3A.

FIG. 3C shows a set of straightened lines based on the sensed paths of FIG. 3B.

FIG. 4A shows a touch input device and a set of input strokes provided via a cover layer.

FIG. 4B shows a set of sensed paths based on the input strokes of FIG. 4A.

FIG. 4C shows a set of straightened lines based on the sensed paths of FIG. 4B.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Although screen protectors often provide improved comfort and durability to user devices, they can also interfere with the operation of the touch screens they are used to protect. For example, the materials and thickness of a screen protector can cause distortion or attenuation of the electric field emitted by a user instrument (e.g., a stylus tool or finger) and sensed by the electrical traces of the touch screen. This can negatively impact the performance of the touch screen by reducing its sensitivity, touch detection accuracy, and speed.

The present disclosure relates to systems, apparatuses, and methods for detecting and compensating for the application of a screen protector to a touch screen device. A computing device having the touch screen device can include a processing device in communication with sensors used, in conjunction with the processing device, to detect the presence of and, potentially, the physical characteristics of (such as the color or thickness of), a screen protector applied to the cover glass of the touch screen. Upon detecting the screen protector, the processor can alter input settings interpreting the signals of the touch screen to compensate for or reduce the negative impacts of the addition of the screen protector to the device.

In some embodiments, the computing device can be configured to receive a first signal from the touch input device over time and can detect a first signal pattern in the first signal. The device can also receive a second signal from the touch input device over a second time and can detect a second signal pattern in the second signal. The device can then determine a difference between the first and second signal patterns and adjust a touch input setting of the device (e.g., its touch screen) to limit the effects of a screen protector causing the difference between the first and second signal patterns. The differences in patterns can include, for example, a change in the average magnitude of the capacitive touch input over time or a change in the shape of a moving input detected by the touch screen. Thus, the output of the touch screen can be monitored over time and then used to determine that a user has applied a screen protector to the display and to react to that change in state of the device, such as by implementing a different capacitive input detection processing algorithm, adjusting the color balance of the output of the display, or curve-fitting, filtering, interpolating, or otherwise smoothing the input. See, e.g., FIG. 2 and its related descriptions herein.

Figure 5:
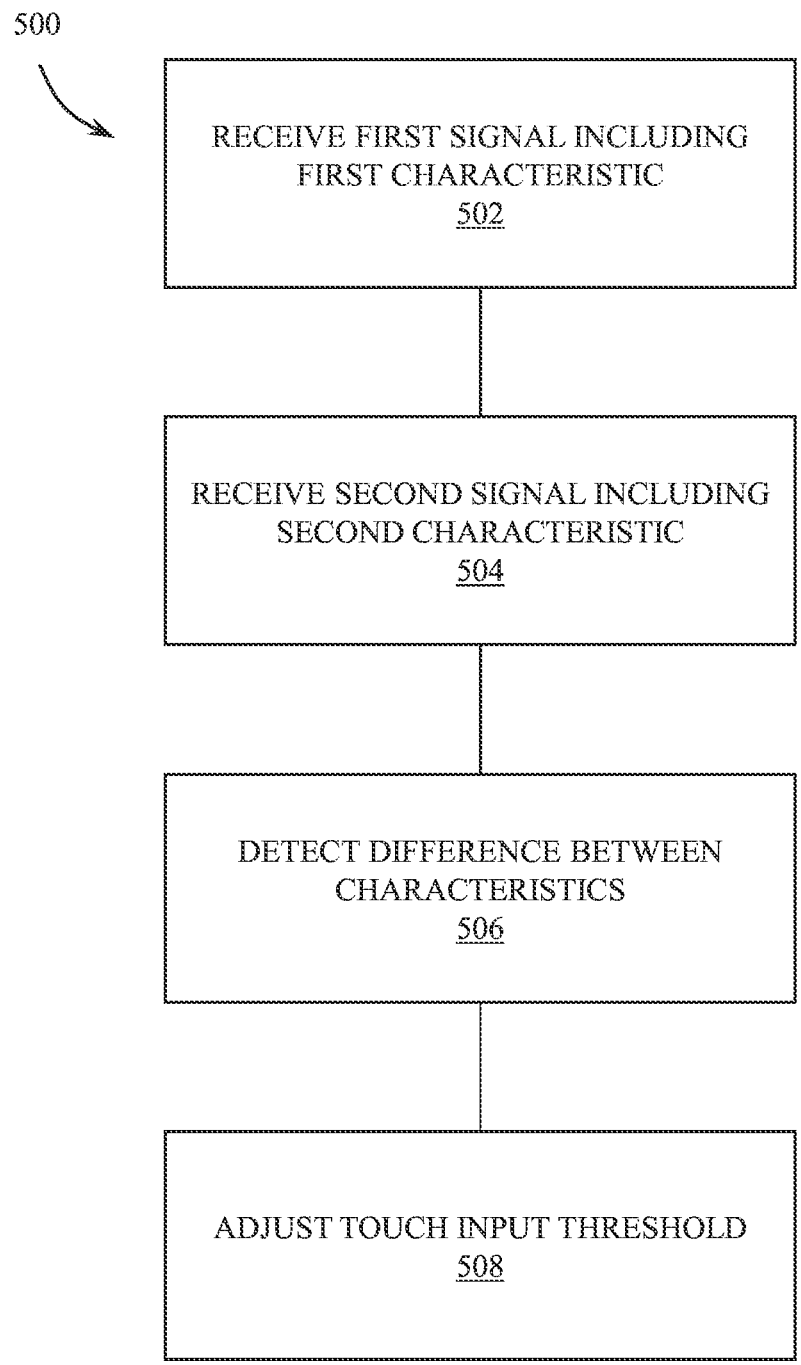
FIG. 5 shows a chart illustrating a process for detecting a cover layer and adjusting the way touch input is interpreted and used by the computing device.

In some embodiments, sensors separate from the touch screen input device (or otherwise not primarily used for touch screen interaction) can be used to detect the presence of the screen protector. For example, the processor of the computing device can receive two separate signals from a sensor at different times, those signals can be measured and compared, and, in response, the processor can adjust touch input or output settings of the touch input device based on the differences between the signals. In some cases, the sensor can be a light sensor (e.g., a camera or ambient light sensor), and the difference between the signals can comprise a difference in the intensity or wavelength/color balance of light provided to the sensor over time in response to the screen protector being applied to the sensor. Similarly, the sensor can comprise multiple light sensors, and the difference between the signals can comprise a difference in the sensed light intensity or color of light provided to one of the sensors as compared to the other as a result of the application of the screen protector to one of the sensors, whether over time or based on simultaneous detections. Additionally, output from a microphone or other audio or pressure sensor can be used to determine whether the input provided to the sensor is muted, distorted, or attenuated by the sensor being covered by the screen protector (e.g., covering a port or microphone sensing aperture on the surface of the computing device). In some embodiments, the sensor can comprise a capacitive sensor configured to positioned adjacent to or around the primary touch sensor of a touch screen display, and the signals detected by this separate capacitive sensor can be used to determine the presence of a screen protector without the touch screen display or interactions with that display influencing the signals. See, e.g., FIGS. 5 and 8 and their related descriptions herein.

These and other embodiments are discussed below with reference to the figures. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a schematic representation of a computing device 100 of the present disclosure. The computing device 100 can include a housing 104 containing a display 102 and having a bezel 106 or frame portion adjacent to and/or surrounding the display 102.

The computing device 100 is shown as a tablet computing device. In some embodiments, the computing device 100 can comprise other types of computer interfaces, such as, for example, touch screens positioned in a housing to be used as a touchpad or trackpad, a personal computer such as a laptop or computing notebook, an e-reader, a smartphone, a smart watch, a kiosk or other standing interface, an electronic pen digitizer, related devices, and combinations thereof. The computing device 100 can comprise electronic computer components in electronic communication with each other, such as, for example, the computer system 1000 discussed in connection with FIG. 10.

The housing 104 can include a rigid base structure used to hold, protect, and support other components of the computing device 100. The housing 104 can include an electrically conductive material such as metal to act as a reference ground for the device 100. The housing 104 can be configured to be held by the user, a stand, or other support (e.g., a desk) while the device 100 is operated. User input provided by a user instrument to the display 102 can vary based on whether the user is holding the housing 104, whether the housing 104 is mounted to a support, and whether a case or cover is positioned on the sides or back of the housing 104 due to change in the electrostatic charge of the user instrument and the device 100 when the input is provided.

The bezel 106 can comprise a portion of the device 100 near the display 102 where output (e.g., backlight of a liquid crystal display (LCD)) is not provided. See bezel portion 730 in FIG. 7 and its related description below. The bezel 106 can have a width dimension extending from a side edge limit of the display to an outer edge or rim of the front face of the device 100 (e.g., an outer edge of the housing 104). In some embodiments, a single cover glass sheet or other transparent panel can cover the display 102 and the bezel 106, with the display 102 being viewable through the transparent panel. In some embodiments, a separate cover can be used over the display 102 as compared to the bezel 106. As discussed in further detail below, sensors (e.g., 108, 110, 112) can be positioned in the bezel 106 at various positions around the display 102. See also FIGS. 6A-7. The sensors can comprise a camera 108 and one or more auxiliary sensors 110, 112 and can be positioned in the bezel 106 of the computing device 100 so as to not interfere with the operation, positioning, or shape of the display 102.

The display 102 can be operable as a touch input device, such as a capacitive touch screen display configured to sense a change in capacitance or voltage drop at one or more areas of its outer surface 114 caused, for example, by the presence of a user instrument (e.g., a hand 116, finger, tool, stylus 118, glove, or similar instrument) which has an electric charge or electric field sensed by the device. The display 102 can comprise an electrostatic arrangement or array of conductive traces, such as surface capacitive sensors and projective capacitive sensor traces, and can thereby detect the proximity and position of the user instrument relative to the outer surface 114. In an example embodiment, the display 102 can include a transparent outer structure (e.g., a cover glass), transparent conductive layers separated by an insulating layer or separator below the outer structure, and a graphical display component (e.g., LCD or e-ink display and backlight) configured to generate images and to provide backlighting for the images generated in a manner visible through the transparent conductive layers. See also FIG. 7 and its description below. The transparent conductive layers can each comprise a set of parallel conductive traces, with one layer having traces oriented perpendicular to traces on another level. See also FIGS. 3A and 4A and their descriptions below. As a result, the position and magnitude of one or more voltage drops at one or more positions in multiple layers can be detected and tracked by the touch screen controller. Thus, the display 102 can be a multi-touch device configured to sense multiple touches, gestures, tool inputs, and similar inputs to receive input for the computing device 100.

The size, shape, electrical field strength, and other physical and electrical characteristics of an input instrument can affect the signals detected by the display 102. For instance, for a grid of conductive elements, multiple nearby elements can detect a voltage change and/or capacitance change in response to the presence of input instrument, and the signal generated by each element can vary based on the proximity of the element to the instrument. Accordingly, a sensor element centered immediately underneath a finger can detect a stronger signal than a sensor element spaced 10 millimeters away from the center. Additionally, environmental effects (temperature, humidity, other nearby electronics, etc.), sensor tolerances, noise, and sensor error can produce small variations in the signals of various sensor elements in the display 102 where the user instrument is used and in areas where the display 102 is otherwise not intended to receive input.

The signals detected by multiple capacitance-sensing elements of the display 102 can be accumulated to form a distribution 120 of detected magnitudes across the positions of the sensor elements of the display 102. The display 102 and its capacitive sensor traces can generate many distributions (e.g., one for each x- or y-axis) to form a matrix of sensor information representing signals collected across the entire touch-sensitive region of display 102.

Each distribution 120 can have a maximum magnitude 122 (i.e., a maximum voltage drop, a maximum capacitance, or maximum change in capacitance) and a shape profile (e.g., a width, a standard deviation, and a symmetricity factor). One such distribution 120 can correspond to an x-axis extending across the display 102 along an axis (e.g., the $x_0$ axis in FIG. 1A). Multiple other similar distributions can correspond to lines extending across the display 102 (e.g., along the $x_1$ axis) that are spaced across the display in another direction (e.g., spaced along the $y_0$ axis). Similarly, distributions can be sensed along a line at the $y_0$ axis and along lines parallel to the y axis (e.g., $y_1$ and $y_2$). In some configurations, distributions can be simultaneously sensed along multiple x- and y-axes. Furthermore, multiple parallel distributions (e.g., multiple distributions measured along $x_0$, $x_1$, and $x_2$ axes (and more)) can be used to determine distributions along a perpendicular axis (e.g., along the $y_0$ axis) by referencing the values of the parallel distributions along the perpendicular axis. Thus, a plurality of sensor signal distributions can be determined for multiple (e.g., all) conductive traces across the touch screen 102. The distributions can collectively be provided to a controller device to determine the size, number, and position of the user instrument(s) based on the magnitudes (e.g., 122), standard deviations, and other properties of each of these distributions.

Figure 1A:
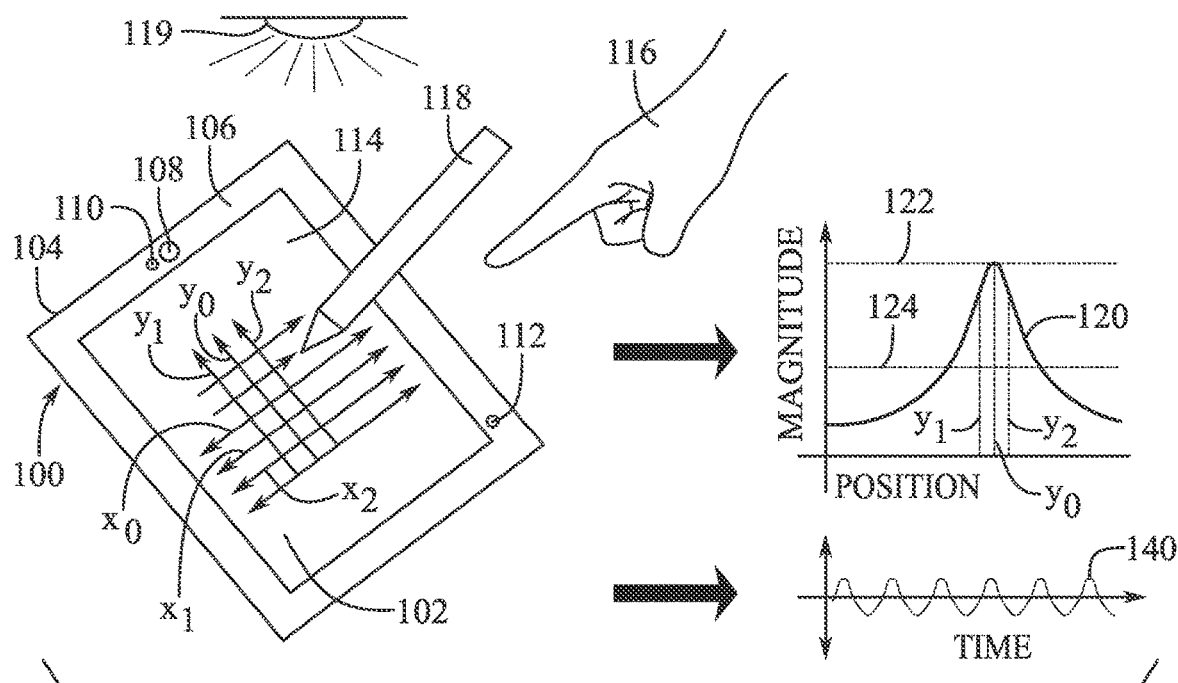
FIG. 1A shows a schematic view of computing device, input devices, and corresponding sensor signals.

As mentioned above, touch screen display 102 sensor signals can vary. Some common sources of the variations are different input methods (e.g., a finger versus a stylus, whether a palm is contacting the display, whether the user is simultaneously contacting the device housing, etc.), environmental factors (e.g., humidity, temperature, nearby electronic devices outputting an electric field, etc.), sensor tolerances, sensor errors, sensor effectiveness drift (e.g., aging electronics), and related effects. To facilitate a more consistent user experience, the display 102 can be calibrated to differentiate between "signal" and "noise" signals sensed by the sensor elements. In some embodiments, the controller of the display 102 can implement a threshold sensor value below which the signals of the sensor elements are ignored or otherwise not interpreted as being a user input. An example calibration threshold value 124 is illustrated in FIG. 1A. Thus, a touch input provided to the display 102 that fails to produce a signal in excess of the threshold 124 may be ignored by the controller. In some embodiments, the calibration threshold value 124 can be used to identify space between multiple simultaneous touches on the display 102. Controller instructions (e.g., software, firmware, or control hardware) can include implementing a touch detection and/or touch tracking algorithm that interprets the signals from the various distributions detected over time to convert the distributions into signals used by the software of the computing device 100 to perform tasks (e.g., to execute user instructions in response to input or to display information to the user, such as by displaying the positions of touches or gestures).

Figure 1B:
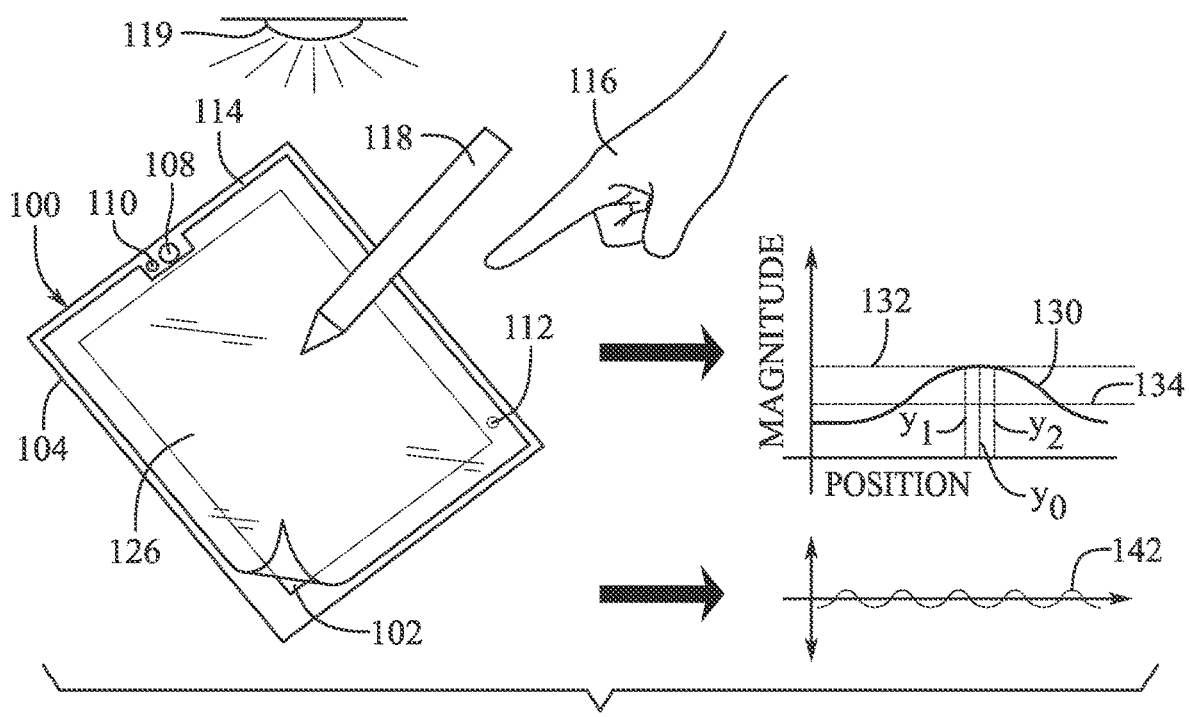
FIG. 1B shows a schematic view of the computing device, input devices, and corresponding sensor signals of the embodiment of FIG. 1A with a cover layer or screen protector installed.

FIG. 1B illustrates the computing device 100 with a layer of material applied to the outer surface 114 where the touch sensors of the display 102 are located. The layer of material can be a cover layer 126 such as, for example, a case or a transparent or translucent screen protector. The cover layer 126 can be rigid or bendable and can comprise a polymer, ceramic, glass, or similar material to prevent scratches, cracking, and other potential wear and damage to the outer surface 114 of the outer layer (e.g., cover glass) of the display 102. In some embodiments, the cover layer 126 has a different texture than the outer surface 114, thereby providing customization to the reflectivity, surface friction, and other properties of the contact surface to which user input is provided to the computing device 100. Generally, the cover layer 126 can be removable from the outer surface 114 without damaging the outer surface 114. The cover layer 126 can therefore be configured to be temporarily mounted to the computing device 100. As used herein, a "cover layer" or "screen protector" is a thin transparent (or substantially transparent) film or sheet adhered to the outer surface of a computing device where touch input is provided. Thus, a cover layer or screen protector differs from a case or sleeve for holding the computing device 100 due to its transparency, its thinness, and its adhesive attachment to a surface through which capacitive touch input is provided and through which display (e.g., an LCD and backlight) is output.

The material, surface finish, and thickness of the cover layer 126 can interfere with (e.g., attenuate or distort) the electric field passing from a user instrument to the sensor elements of the display 102. For instance, as shown in FIG. 1B, a sensor distribution 130 can have a different maximum magnitude 132, standard deviation, and other shape characteristics when the same input is provided (as compared to distribution 120). This change in distribution 130 can introduce uncertainty into the system regarding the location of the input. For example, as shown in FIG. 1B, the position of the input could be at position $y_0$, $y_1$, or $y_2$ without significantly changing the magnitude of the distribution 130. By comparison, the same positions $y_0$, $y_1$, and $y_2$ for distribution 120 would cause a more significant change in magnitude, with $y_1$ and $y_2$ having lower magnitude than $y_0$. Thus, the interference of the cover layer 126 can reduce the magnitude of the signal sensed by the touch sensors of the display 102, can increase the standard deviation of the distributions sensed, and can thereby reduce the certainty of the position of the input. In response, the performance of the touch screen display 102 can be negatively affected, such as by touches being detected at the wrong position or by touches not being detected when applied. As discussed in further detail below, this can be particularly problematic for situations where fine tapping or fine gesture input is provided (e.g., input is provided that only spans a distance crossing a small subset of touch sensor traces) and where fine input needs to be tracked and shown to the user (e.g., when an application is supposed to show straight lines drawn across the display by a pointed user instrument).

Furthermore, a display screen 102 is generally configured with touch traces that are arranged in a grid having trace lines that are parallel to the edges of the display 102 (e.g., the traces along various axes $x_n$ and $y_n$ in FIG. 1A). Touches that are positioned substantially directly over a trace line can cause higher magnitude signals (e.g., at $y_0$ in FIGS. 1A-1B) as compared to touches that are between two trace lines. For at least this reason, accuracy of the user input position detection control instructions can be reduced for input applied between trace lines, such as when a user is providing input along diagonal lines (i.e., lines at least partially oriented at an angle relative to the primary axes of the trace grid). Such a reduction in touch positioning accuracy can be exacerbated by the presence of the cover layer 126. When the user instrument is used to "draw" lines on the display 102, straight and smooth input can have its tracked position have an increased spatial frequency or wave amplitude (i.e., can become more visually jittery or wavy) instead of following the relatively straight and smooth course expected by the user. See FIGS. 3A-4C and their related descriptions below.

Figure 2:
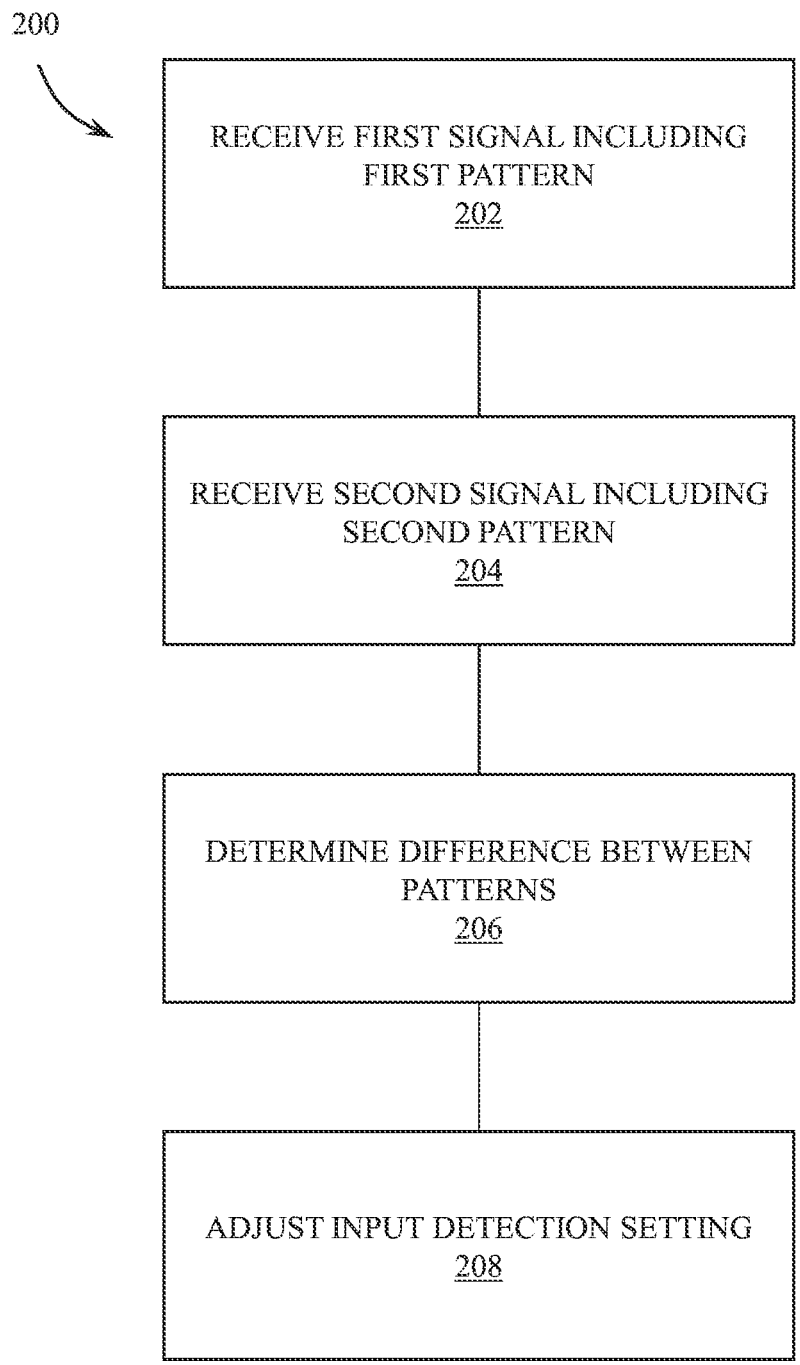
FIG. 2 is a chart illustrating a method for detecting a cover layer and adjusting the way that touch input is interpreted and used by the computing device.

Accordingly, embodiments of the present disclosure relate to the detection of a cover layer (e.g., 126) by at least partially using the signals produced by the touch sensors of the display 102. FIG. 2 illustrates a process flowchart that can be used to detect the presence of the cover layer and to adjust the way that touch input is interpreted and used by the computing device to compensate for the presence of the cover layer. As shown in block 202, the control method 200 for the computing device can include receiving a first signal. The first signal can be obtained from a touch input device over a first duration of time and can include a first signal pattern. For instance, a controller (e.g., processor, processing device, touch controller, CPU, and other controllers) can receive a signal from a touch input device (e.g., display 102 or, more specifically, capacitive touch sensing components of the display 102). The signal can comprise a set of signals that are collected from the touch input device in response to user input over the first duration of time. In an example embodiment, a set of sensed signals from a set of touch-sensitive traces of the display 102 can be collected as a group of aggregated distributions (e.g., 120) or individual magnitudes and positions sensed by the display 102 at a point in time or over a length of time. In a similar embodiment, a set of sensed signals from the traces can be collected as a set of distributions sensed over time or individual magnitudes and positions that are sensed over time.

The first duration of time of block 202 can comprise any predetermined minimum length of time, ranging, for example, from several minutes to a day or longer. In some embodiments, the first duration of time can comprise a sufficient length of time to track the characteristics of the first signal and to determine baseline values for the characteristics of the first signal, such as a baseline average or median magnitude, average or median peak/maximum magnitude (e.g., 122), average or median standard deviation, and similar characteristics that are representatives of sets of underlying sensor data. In some embodiments, the first duration of time can be defined after receiving a second signal in connection with block 204, as explained in further detail below.

The first signal pattern can include a recurring shape, standard deviation, magnitude, and/or other value of the first signal that is detected over time. For example, the first signal pattern can comprise an average or median peak magnitude that stays within a range of magnitudes during the first duration of time. Similarly, the first signal pattern can include an average standard deviation that stays within a range of standard deviations over the first duration of time. The range can have an upper bound and a lower bound that are each configured to represent expected limits (e.g., experimentally derived limits) on the signal characteristic being tracked based on the type of computing device being operated, the age of the device, detected environmental conditions, and the number and nature of the touches detected (e.g., the total number of touches detected (vs. not detected), the number of multi-touches detected, the number of single touches detected, the number of palm touches detected, the frequency of touch detections, and other touches), and/or the types of touches detected (e.g., gestures vs. taps or finger touches vs. stylus touches)).

Using this information, the system can detect the first pattern in the information, and that first signal pattern can represent a characteristic of the inputs that is expected to be continued to be detected by the computing device over time. In other words, the signal pattern can be used to establish an expected or predicted input characteristic (e.g., distributions having a maximum magnitude within a certain range) for inputs of a certain nature (e.g., touches vs. stylus input) in a time period following the first duration of time. The expected or predicted input characteristic can change over time as more data is gathered from the sensor(s).

As shown in block 204, the process 200 can also include receiving a second signal obtained from the touch input device over a second duration of time separate from the first duration of time. The second signal can include a second signal pattern. The second signal pattern can correspond to the first signal pattern but for the second duration of time. For example, the second signal pattern can include an average peak magnitude of a touch input provided to the touch input device during the second duration of time. Thus, one or more additional signals can be received by the processor after the first duration of time concludes and a separate duration of time begins.

In some embodiments, the first duration of time is a predetermined length of time (e.g., a certain number of hours of usage of the touch input device), in which case the second duration of time can begin at the end of that predetermined length of time and can extend beyond the end of the first duration of time. In some embodiments, the first and second durations of time are separate portions of a larger period of time. For example, data can be collected from the touch input device for one week, and the Monday of that week can be defined as the first duration of time and the Wednesday can be defined as the second duration of time. Accordingly, the first and second durations of time do not necessarily need to be consecutive and do not necessarily need to extend for an equal time duration. However, in an example embodiment, the first and second durations of time are consecutive, and the time at which the first duration ends and the second duration begins can be determined after all of the data of the first and second durations has been recorded and analyzed by the computing device controller (e.g., in connection with block 206).

In block 206, the process 200 can include determining a difference between the first signal pattern and the second signal pattern. To do so, the processor can compare one or more representative values (e.g., the average peak magnitude sensed) in a first portion of the data recorded (e.g., in block 202) to a second portion of the data recorded (e.g., in block 204). The difference can be identified as a persistent change in the representative value over time as input continues to be provided to the touch input device, and the change can exceed a minimum threshold variation value that would correspond to expected input variation when a screen protector layer is not installed on the device. For example, an average/median/rolling-average peak magnitude (or standard deviation) can be initially detected to lie within a range of values but then suddenly changes to lying within a different range of values. This change in the expected range of peak magnitudes (or standard deviations) can be detected in the execution of block 206 and can be used as an indicator of the installation of a screen protector/cover layer (e.g., 126) that dampens the signals sensed by the touch input device while it is installed. The time at which the input characteristic changes its expected range of values can be identified as the time at which the first duration of time ends and at which the second duration of time begins.

In another embodiment, determining the difference between the first and second signal patterns can include detecting the existence of the first signal pattern (determined in the performance of block 202) and detecting the existence of the second signal pattern (determined in the performance of block 204) in a block of input signals received. For example, the first signal can include a set of diagonal line drawing inputs (see, e.g., FIG. 3B and its descriptions below), and the second signal can include a similar set of diagonal line drawing inputs that have different characteristics (see, e.g., FIG. 4B and its descriptions below). Block 206 can then determine whether those different characteristics are representative of the installation of a cover layer on the display or not, such as by determining whether an increase in the frequency or size of certain wave patterns in the diagonal line drawing inputs exceeds a minimum expected variation threshold (corresponding to when a cover layer is not installed). The process 200 can then include reacting to the changed touch input device sensitivity and accuracy after or during the second duration of time. The second duration of time can be equal to the first duration of time and can be shorter or longer than the first duration of time. Generally, the second duration of time can be configured to have a minimum length to ensure that the change from the first signal pattern to the second signal pattern is sustained in a manner indicative of a screen protector being consistently in place as opposed to simply being an outlier variation in the signal.

In another embodiment, the first signal pattern can be tracked over a first duration of time to determine an expected range of one or more input characteristics, as explained above. This first duration of time can be ongoing while the system waits for a significant variation in the input characteristic(s). Thus, rather than collecting an extended amount of data to detect a change from the first signal pattern to the second signal pattern, and rather than retroactively identifying the first duration of time and the second duration of time from a larger duration of time, the controller can detect the onset of the second signal pattern/second duration of time when a small number of input characteristic data points (e.g., immediately upon receiving a single data point) appears outside the expected range of input characteristics established over the first duration of time. Thus, the computing device can quickly respond (e.g., via performance of block 208) to an installation of a screen protector/cover layer when certain characteristics are immediately indicative of the change from uncovered outer surface (e.g., in FIG. 1A) to covered outer surface (e.g., in FIG. 1B).

FIG. 2 also shows that the process 200 can include adjusting an input setting (e.g., a touch input detection setting) in block 208 in response to determining a difference between the patterns in block 206. Adjusting an input setting can comprise changing a setting of the touch input device receiving the sensed touch input. For example, a minimum touch threshold value can be decreased (e.g., from threshold value 124 in FIG. 1A to threshold value 134 in FIG. 1B) upon determining the difference in patterns to enable lower-magnitude touches to be more consistently detected. In another example, block 208 can include changing a smoothing or interpolation setting of the touch input device for inputs (e.g., sliding inputs) provided to the touch input device. A control setting can be increased or reduced for a sensed line's or stroke's curve-fitting, filtering, jitter, spacing, fall off, motion filtering, tapering (e.g., pressure tapering), color dynamics, bleed, flow, and/or other related characteristics.

Other settings adjusted can include screen input/output settings, such as, for example, a brightness setting, color output/temperature setting, input refresh rate, etc. for the display 102. Specifically, the detected presence of a screen protector/cover layer can initiate a change in (a) the color temperature of the display that corrects for color filtering caused by the cover layer, (b) the size of graphics or text on the display to correct for blurriness or haziness caused by the cover layer (e.g., increased visual size to reduce text kerning effects/object edge blurring), (c) the refresh rate of receiving input by the display to collect more input data to correct for inaccuracy caused by the cover layer, and/or (d) the brightness of the display to correct for dimming of the display caused by the cover layer.

In another example embodiment, adjustment of an input setting can include providing a prompt or request to a user that indicates that a screen protector/cover layer may have been detected or that requests the user to confirm whether such a layer has been installed. The user's response can be a trigger that causes the controller to implement a different touch input interpretation algorithm, screen sensitivity setting, color output setting, or other response described herein.

Accordingly, the computing device 100 can change its operating settings from implementing a first touch input interpretation and/or control algorithm configured to sense and interpret input without a cover layer to implementing a second touch input interpretation and/or control algorithm configured to sense and interpret input provided through the cover layer 126. Thus, although accuracy of the identification of detected input may decrease, the visual representation of that detected input can be simplified, straightened, smoothed, or otherwise "cleaned up" to compensate for or mask the detrimental impacts caused by the cover layer.

FIGS. 3A-3C and 4A-4C illustrate an example implementation of the process 200 as applied to a touch screen input device. The touch input device 300 (e.g., display 102) can include a first array of lateral sensor traces 302 extending parallel to each other along a first direction of the plane defined by the touch input device 300. The touch input device 300 can also include a second array of lateral sensor traces 304 extending parallel to each other on a different depth layer of the device 300 relative to the first array. The first and second arrays can therefore be spaced apart from each other on different depth layers of the device 300 yet, when viewed perpendicular to the primary plane of the device 300, can form a grid of perpendicularly overlapping trace lines, as shown in FIG. 3A. FIGS. 3A and 4A show the grid extending along only a portion of the display plane, but the grid can extend across the entire surface thereof.

Input strokes 306, 308 can be applied to the touch input device 300 by a user instrument. A set of aligned input strokes 306 extend parallel to one of the arrays of lateral sensor traces (i.e., 304), and a set of diagonal or angled input strokes 308 extend at a diagonal or angle that is not parallel to the arrays of lateral sensor traces. Without a screen protector or other cover layer applied to the touch input device 300, the position of the user instrument can be tracked as shown in FIG. 3B, wherein the first set of sensed paths 310 corresponds to the sensed positions of the user instrument when the aligned input strokes 306 are applied to the touch input device 300. The second set of sensed paths 312 corresponds to the sensed positions of the user instrument when the angled input strokes 308 are applied.

The sensed paths 310, 312 can have spatial frequencies, such as a wavelength-like frequency at which the paths 310 deviate from a central line or curve. Example peak-to-peak distances 314 and 316 for the spatial frequencies are indicated in FIG. 3B. The paths 310, 312 can also have magnitudes or amplitudes of deviation from that central line or curve that are maximum at the peaks of deviation from the central line or curve (or peak-to-opposing-peak amplitudes). The sensed paths 310, 312 have wave-like, recurring properties due in part to the nature of the touch input device 300 having a grid configuration for the sensor traces 302, 304. Accuracy of detection of the user instrument is enhanced when the user instrument is overlapping a trace or is near an intersection of multiple traces, and accuracy decreases between traces. Thus, the peak-to-peak distances 314 of a path 310 substantially parallel to a trace 304 can correspond to a distance between the perpendicular traces 302. The peak-to-peak distances 316 of an angled path 312 can correspond to a diagonal distance between traces 302, 304. Thus, the distances 314 can be less than the distances 316 due to the strokes 306, 308 respectively spanning less distance and more distance between traces 302, 304. Similarly, the corresponding "frequency" signal pattern of sensed paths 310 can be higher than sensed paths 312. Furthermore, in either case (input 306 or 308), variation in amplitude relative to the central line or curve through the sensed paths 310, 312 can be expected to lie below a maximum value. The touch input device 300, in conjunction with a controller or processor, can implement an input interpretation or filtering algorithm to filter, interpolate, curve-fit, or otherwise smooth the sensed paths 310, 312 to straight (or at least straighter) lines 318, 320, as shown in FIG. 3C. Thus, although the sensed paths 310, 312 are not as straight as the input strokes 306, 308, the lines 318, 320 displayed to the user can be corrected to appear substantially the same as the input strokes 306, 308.

As shown in FIG. 4A, a cover layer 400 (e.g., 126) can be applied to the touch input device 300 when the input strokes 306, 308 are applied. The presence of the cover layer 400 can affect the accuracy of the sensed paths 410, 412. Thus, the peak-to-peak distances 414, 416 can be larger in magnitude and/or less consistent in magnitude as compared to distances 314, 316. The amplitudes of the sensed patterns in paths 410, 412 can also be increased or more inconsistent relative to the amplitudes of paths 310, 312. As a result, applying the same input interpretation or filtering algorithm to the paths 310, 312 would not necessarily (or would not consistently) produce smooth or straight lines like lines 318, 320. Instead, a different, potentially more powerful input interpretation or filtering algorithm may be implemented to filter, interpolate, curve-fit or otherwise smooth the sensed paths 410, 412 to produce straight (or at least straighter) lines 418, 420. For example, the new algorithm for FIGS. 4B to 4C can more aggressively convert input curves to lines as compared to the algorithm used for FIGS. 3B to 3C by treating large deviations (e.g., along 412) as being part of a straight or smooth stroke rather than as a zig-zag or undulating line intentionally drawn by the user instrument. Alternatively, the new algorithm can use a larger amount of sample input data when stabilizing or curve-fitting processing the input as compared to the other algorithm.

The process 200 described above can be used to trigger a transition between implementing the input interpretation or filtering algorithm used to produce lines 318, 320 and the algorithm used to produce lines 418, 420. Specifically, a controller can receive a first signal (e.g., paths 310, 312 and an additional amount of paths as deemed necessary for calibrating the touch input device 300) during a first duration of time, and the controller can detect a first pattern. The first pattern can include a set of peak-to-peak distances 314, 316, a set of amplitudes in sensed paths 310, 312, and/or derived quantities (e.g., standard deviations) based on those values. Over a second duration of time, the controller can detect a second pattern (e.g., peak-to-peak distances 414, 416, amplitudes in paths 410, 412, and/or derived quantities) in a second signal from the touch input device 300. A difference in the patterns can be detected (e.g., peak-to-peak distances 414, 416 or wave-shape amplitudes exceeding a threshold limit), and the controller can, in response, adjust an input detection setting by changing from the first input interpretation or filtering algorithm to the second algorithm.

In some embodiments, the difference in the first and second signal patterns can be more easily detected and exaggerated when comparing sensed input paths that are non-orthogonal (e.g., angled) relative to the sensor trace grid axes due to the increased accuracy drop caused by the presence of the cover layer 400 combined by the increased distance between traces when moving off-axis between the traces. Accordingly, in some cases, the controller/processor can specifically search for first and second signal patterns in input paths 312, 412 that follow courses that are primarily non-orthogonally-oriented relative to the sensor trace grid. Signal patterns in parallel input paths 310, 410 may be ignored or de-prioritized as compared to the non-orthogonal paths. Prioritizing non-orthogonal paths in this manner can improve the accuracy of detection of the cover layer 400 in devices 300 having grid-configured sensor traces.

Referring again to FIG. 1A, the computing device 100 can include sensors 108, 110, 112 that can be used to assist in detection of a cover layer 126 on the display 102. These sensors 108, 110, 112 can be configured to receive signals through the outer surface 114 used to provide input to the display 102. Thus, the signals sensed by one or more sensors 108, 110, 112 can be affected by the installation of a cover layer 126, as explained in further detail below.

In some embodiments, a single sensor (i.e., one of the sensors 108, 110, 112) can be configured to be used for detection of a cover layer on the outer surface 114. For example, the single sensor can be sensor 112 which is typically uncovered while no cover layer 126 is installed, but is typically covered by the cover layer 126 after installation of layer 126. Thus, the sensor 112 can beneficially be positioned in a portion of the bezel 106 that is typically protected by a cover layer 126, such as a portion of the bezel 106 immediately adjacent to the perimeter of the display 102. The single sensor can be in electronic communication with a processor or controller configured to execute a process 500 illustrated in FIG. 5. In block 502, the controller can receive a first signal obtained from the sensor at a first time, and the first signal can include a first signal characteristic.

The signal and characteristic can depend on the type of sensor used. For example, the sensor 112 can include a microphone or other audio or sound sensor, in which case the first signal characteristic can include an amplitude, frequency spectrum, or other related property of sounds, wherein the characteristic may be affected by at least partially covering or obstructing the sound sensor at the outer surface 114 by a cover layer.

In another example, the sensor 112 can include a light sensor such as a camera sensor or ambient light sensor (ALS). Thus, the first signal characteristic can include a color spectrum, color value, brightness, contrast, saturation, focus/blurriness heuristic, wavelength, or other related image or light property measured from light 119 (e.g., a light source such as the sun, a light bulb, etc. or light reflected from a surface) sensed by the sensor 112 and which is affected by the presence of the cover layer 126 (when it is installed).

In yet another example, the sensor 112 can include a touch sensor (e.g., a capacitance sensor, capacitive touch pad, pressure sensor, capacitive touch trace, etc.), in which case the first signal characteristic can include an average magnitude, peak magnitude, rate of change in magnitude, standard deviation, or other characteristic discussed above in connection with block 502 and FIGS. 1A and 1B. In this embodiment, the touch sensor would be separate or different from the touch sensor used for the touch screen display 102 but would still be accessible or interacted with through the outer surface 114. See, e.g., descriptions of FIGS. 6A, 6B, and 7 elsewhere herein.

In still another example, the sensor 112 (or another sensor 110) can include a temperature sensor (e.g., thermometer, thermocouple, infrared/laser/other radiation-based thermometer, or related device), in which case the signal characteristic can include an average temperature, rate of change of temperature, maximum temperature, or similar characteristic. Application of a cover layer can potentially insulate or otherwise change the level of heat transferred to the temperature sensor, and the changes in temperature readings can be tracked and compared (as in the processes of FIGS. 2 and 5 or others described herein) to detect the presence of the cover layer on the computing device 100. In some embodiments, a temperature sensor does not need to be exposed to the same outer surface as the surface to which the cover layer is applied in order to generate a signal indicative of the cover layer's installation on the device. In other words, the temperature sensor can be positioned within the housing of the computing device and/or behind/beneath the touch sensor (e.g., display 102) relative to the cover layer or the outer surface and can still, by virtue of detecting the change in temperatures or heat transfer caused by insulation of the cover layer, detect the presence of the cover layer.

In block 504, the process 500 includes receiving a second signal from the sensor at a second time, with the second signal having a second signal characteristic. For example, the sensor 112 can provide another signal at a different time. The processor or controller can be configured to determine whether a cover layer has been added to (or removed from) the outer surface 114 using the second signal, as explained below. Generally, the first and second signal characteristics are of the same characteristic type, such as both being amplitudes, wavelengths, frequency spectra, etc., so that they can be directly compared to each other.

In block 506, the process 500 includes detecting a difference between the first and second signal characteristics. The difference can be detected by directly comparing one signal characteristic to another, such as by detecting that an amplitude of one signal is higher or lower than the other, that the color temperature changes from one level to another, that certain audio frequencies are filtered out or attenuated between the two signals, etc. For any type of sensor 112, the first and second signal characteristics can, in some embodiments, be an average or median value found in the signal. Accordingly, when the signal characteristics are compared and differences in the characteristics are detected in block 506, an averaged or otherwise representative value of a first set of signals collected over a first period or duration of time can be compared to another representative value for a second set of signals collected over a second period or duration of time. In such cases, detecting a difference in the first and second signals can include detecting a difference in the representative value. This can help limit false positives caused by fluctuations in signals sensed by the sensor 112 over time and under various sensor-influencing environmental and input conditions that are not caused by introduction of a cover layer.

Detecting a difference in block 506 can include determining that the difference between the first and second signal characteristics exceeds a threshold minimum value. The threshold minimum value can be based on sound, light, or touch/capacitance interference profiles empirically or theoretically determined and applied to data sets such as the first and second signal characteristics. In other words, the threshold minimum value can be determined based on how the sensor is expected to behave differently in response to being covered by (or uncovered from underneath) the cover layer 126. For example, a sound profile can be developed for a microphone, wherein cover layers applied to the outer surface 114 filter out or attenuate certain high frequencies in the output of the microphone signal, and that sound profile can be compared to the second signal and its frequency characteristics to determine whether the same or essentially the same high frequencies are filtered or attenuated as compared to the first signal and its frequency characteristics. If the high frequency sounds are sufficiently filtered (e.g., filtered beyond a standard amount of deviation in an uncovered device), the controller can increase its confidence that a cover layer 126 has been applied to the computing device 100. In another example, certain wavelengths of light sensed by an ambient light sensor or camera sensor can be filtered or attenuated by the presence of the cover layer, so detecting the difference between signal characteristics can include detecting that those certain wavelengths are found in intensities below an expected minimum value for an uncovered device.

When a significant enough difference is detected between the first and second signal characteristics, the controller can deductively determine that a cover layer is present on the outer surface 114 and on the display 102 since, presumably, a cover layer would not be applied to the bezel 106 or a sensor 112 alone. In block 508, the process 500 can further include adjusting a touch input threshold of the touch input device based on the difference between the first and second signal characteristics. The adjustment of the touch input threshold can include changing a setting that compensates for an effect introduced by the installation of the cover layer. For instance, adjusting the touch input threshold can include decreasing a sensitivity threshold of the touch screen (e.g., changing from threshold 124 to threshold 134), increasing the touch controller's polling or sensing frequency, or taking other actions described elsewhere herein.

In some embodiments, instead of (or in addition to) adjusting a touch input threshold in block 508, the controller can change output settings of the touch input device or input settings of a sensor. For instance, the controller can increase the display brightness from a lower level at which input was received for the first signal to a higher level after detecting the difference between the first and second signal characteristics. Similar adjustments can be made to the sensor or other input/output devices of the computing device 100 to counteract the effects of the cover layer as well, such as, for example, adjusting color balance of the display or muting a microphone that has been covered and is therefore unsuitable for receiving audio input.

Figure 6A:
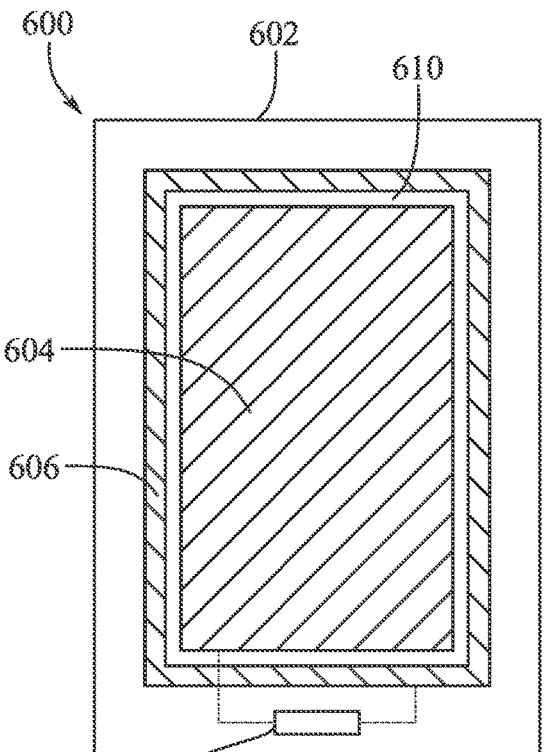
FIG. 6A shows a computing device having multiple capacitive touch input devices and a controller in a housing.

FIG. 6A illustrates an example embodiment of a computing device 600 (which can be an embodiment of computing device 100) wherein the housing 602 contains a first capacitive touch input device 604 and a second capacitive touch input device 606. The first device 604 can be a primary input device for the computing device 600 (e.g., display 102), and the second device 606 can be a secondary or auxiliary input device. Both input devices 604, 606 can be configured to be at least partially (e.g., entirely) covered by the cover layer when it is applied to the computing device 600 in such a manner sufficient to affect the capacitive sensing capability or sensitivity of the input devices in the covered area(s). The second device 606 can be used as sensor 112 in the execution of the process 500 of FIG. 5. Both input devices 604, 606 can be electronically connected to a controller 608 (e.g., processor, touch controller, or similar device), thereby allowing their signals to be differentiated from each other by the controller 608. An air gap or other insulator 610 can be positioned between the input devices 604, 606 to electrically isolate them from each other, thereby reducing or eliminating a change of capacitance in one input device (e.g., 606) caused by a user's interaction with the other device (e.g., 604). Alternatively, a gap or insulator can be omitted, and the secondary device 606 can include a portion of the main input device 604 dedicated to screen protector detection.

In some circumstances, using a single capacitive input device (e.g., display 102) to receive input from the user and to detect the presence of a cover layer/screen protector can lead to uncertainty and false positives/negatives due to fluctuating influence of the user input (e.g., from different users, different user instruments, etc.) and environmental factors. By using two separate capacitive input devices 604, 606, the influence of the user's input is less significant because the user may not primarily contact or use the second device 606 to provide input. Accordingly, fluctuations in the sensed capacitance signals generated by the second device 606 can more reliably be used to detect whether a cover layer/screen protector has been installed as compared to the signals from the first device 604. The limited amount of user interaction with the second device 606 can ensure that baseline sensor data collected from the second device 606 (e.g., first signal data in block 502 and second signal data in block 504) is more consistent and therefore more clearly differentiable between when a screen protector is present and when it is not present.

Figure 6B:
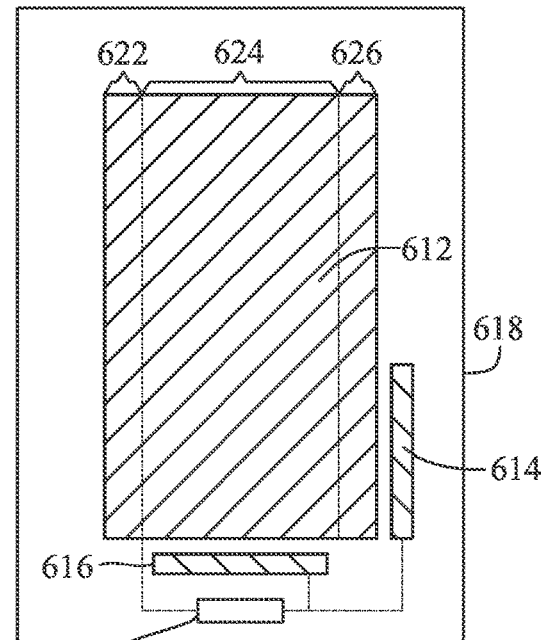
FIG. 6B shows a computing device having multiple capacitive touch input devices and a controller in a housing.

FIG. 6B shows a similar embodiment to FIG. 6A, but wherein a primary input device 612 is supplemented with a second input device 614 and a third input device 616 that are formed as smaller "patches" or reduced-size regions relative to the primary input device. The primary device 612 is electrically connected to the controller 608 independent of the second and third devices 614, 616, which can each be independently electrically connected to the controller 608 or can share a connection Like input device 606, the second and third devices 614, 616 can be arranged in a bezel or similar area of the computing device that is configured to be uncovered when a cover layer is not installed but is covered after such installation. However, unlike input device 606, the second and third devices 614, 616 can be smaller and more compact. Additionally, they can be sized and positioned on the computing device so as to be in positions not typically held by the user's hands, such as along edges 618, 620 where a user may be less likely to grasp the device, thereby further limiting the influence of the user on the input devices 614, 616 relative to the influence of the screen protector (or lack thereof). In some embodiments, the input devices 614, 616 can be sized and positioned on the computing device so that a typical human hand is not large enough to grip the device and entirely cover one or both input devices 614, 616. Thus, if one input device 614/616 is used, the device can be sized so that a single hand cannot cover the entire surface area (e.g., in a manner that would imitate complete coverage by a cover layer), and if more than one input device 614, 616 is used, they can be spaced apart sufficient to avoid simultaneous hand obstruction. Additionally, input devices 614, 616 can be beneficially placed away from the corners of the housing so as to permit the housing to be structurally reinforced in those areas rather than having to make space for input devices 614, 616.

In some embodiments, primary input device 612 can be a touch screen display or touchpad similar to display 102 or input device 604, with its entire capacitance-sensitive area being also used for display purposes. Additionally, in some embodiments, the input device 612 can have distinct sections or segments configured for sensing whether a cover layer has been put into position on the device. At least one of these segments can be capacitance-sensitive while not also being part of an output/display. For instance, in the example shown in FIG. 6B, the input device 612 can have three adjacent sensing areas 622, 624, 626. The first area 622 can be capacitance-sensitive without also being an area through which a display is provided (i.e., it does not overlap the LCD, backlight, and related components). The second area 624 and third area 626 can be capacitance-sensitive and display areas. All three areas 622, 624, 626 can be interconnected as part of a single touch sensor device 612, but the areas can be used for different purposes. Area 624 can be used as a primary area for interaction with the user, similar to input device 604. Area 622 can be used similar to input devices 606, 614, or 616, wherein capacitance sensed in area 622 is not expected to be influenced by user interaction due at least in part to there being a lack of a display in area 622. Thus, the capacitive sensing area of the device 612 can extend to a portion of the bezel or other non-display area that would be covered by a screen protector, and signals from that additional sensing area can be better suited to detect the screen protector as compared to signals from an area with which the user regularly interacts (and therefore regularly causes fluctuations in the capacitance sensed). In some embodiments, area 626 is used as an extension of area 624. However, in some embodiments, the controller 608 can prioritize or give extra weight to area 626 for detecting the presence of a cover layer as compared to area 624. For example, when the controller is determining whether a cover layer is attached to the outer surface, the controller can use only data from area 626 as the sensor in process 500 or can prioritize the data from area 626 over the data from area 624 when identifying signal characteristics (e.g., blocks 502, 504) or detecting differences between signal characteristics (e.g., block 506). Touch input thresholds can be adjusted (e.g., in block 508) for one or more areas 622, 624, 626 as a result of detecting sensor data indicative of a cover layer.

Figure 7:
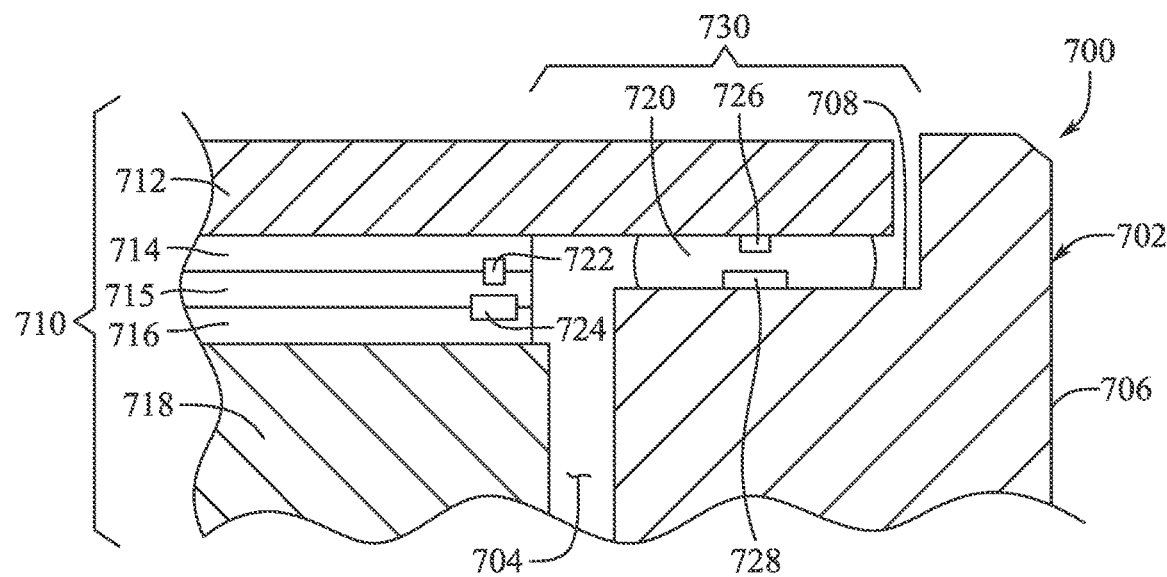
FIG. 7 is a cross-sectional side view of a computing device at an outer corner of the housing and cover glass.

FIG. 7 illustrates an example cross-section of a computing device 700 (which may be computing device 100, 600, etc.) showing how components can be positioned in the touch input device and housing assembly. The housing 702 of the computing device 700 can include an inner cavity 704, an outer side surface 706, and a shelf or bezel support portion 708 therebetween. A display assembly 710 can be positioned in the cavity 704 which can include a cover glass 712, an first touch trace layer 714, an insulator layer 715, a second touch trace layer 716, and an output display 718 (e.g., LCD and backlight). The cover glass 712 can comprise glass, polymer, or another transparent or translucent material. The cover glass 712 can be bonded to adhered to the support portion 708 of the housing 702 by an adhesive or bonding agent such as a pressure-sensitive adhesive 720. The trace layers 714, 716 can include a plurality of sensor traces (e.g., 302, 304) to sense a user instrument at or in proximity to the cover glass 712.

In some embodiments, particular touch traces 722, 724 of the first and second trace layers 714, 716 can be used for detection of a cover layer on the cover glass 712. These traces 722, 724 can therefore be used as a sensor area similar to area 626 if the display 718 is configured to output information through the traces, or can be used as a sensor area similar to area 622 if the display 718 does not output information through the traces. Thus, the traces 722, 724 are an integral part of the display assembly 710 and are positioned internal to the edge of the cover glass 712 and within a cavity 704 of the housing 702. This configuration can help minimize the overall touch sensor perimeter/area and minimize the size of the device bezel and housing.

In some embodiments, touch traces 726, 728 can be positioned in a bezel portion 730 of the cover glass 712 and/or between the cover glass 712 and the shelf or bezel support portion 708 of the housing 702. The touch traces 726, 728 are therefore separate from the display assembly 710, similar to input devices 606, 614, and 616. In computing device 700, the traces 726, 728 can be positioned in the pressure sensitive adhesive (PSA) 720, a flexible printed circuit, or other trace carrier plate structure positioned where the PSA 720 is located in FIG. 7. In other words, element 720 can comprise a flexible printed circuit or other trace carrier plate structure. If a flexible printed circuit or other trace carrier plate structure is used, it can include adhesive layers on its top and bottom faces to serve a coupling function similar to the PSA 720 by keeping the cover glass 712 and housing 702/bezel support portion 708 held to each other. In any case, the PSA 720, flexible printed circuit, or other trace carrier plate structure can reduce part numbers in the assembly and can permit extra lateral separation between the capacitance-sensing elements of display assembly 710 and the touch traces 726, 728 in the bezel portion 730. These configurations can also help isolate the signals of the traces 726, 728 from the signals of the trace layers 714, 716. Using a flexible printed circuit or other trace carrier plate structure containing touch traces 726, 728 can beneficially help to control trace widths and the relative positions of the touch traces 726, 728 and the housing 702 because the traces are precisely printed onto the circuit substrate and therefore more fixed in shape as compared to a portion of relatively more flexible PSA. The flexible printed circuit or other trace carrier plate structure configurations can also ease manufacturing by ensuring that the touch traces 726, 728 are fixed to a substrate that can be more easily placed on the housing 702 or cover glass 712 as compared to placing traces in or on a body of PSA. The inner pair of touch traces 722, 724 can be optional, as well as touch traces 726, 728.

In some embodiments, touch traces 722 and 726 can be capacitive sensor electrodes, and touch traces 724 and 728 can be either driven shields or dedicated sensor ground elements. When traces 724 and 728 are used as a driven shield, trace 728 can be used to compensate for grounded metal in the shelf or bezel support portion 708 and the housing 702 to improve the sensing capability of trace 726 as a capacitive sensor electrode or to reduce the drive and sense capability requirements of the touch controller 608. The traces 722, 724, 726, 728 can be connected to the existing touch controller 608 used for touch traces in layers 714 and 716 or to a separate and dedicated capacitive sensing integrated circuit used exclusively for detection of a cover layer, similar to the components discussed in connection with FIGS. 6A and 6B.

Referring again to FIGS. 1A-1B, in some embodiments, multiple non-touch- or non-capacitance-sensitive sensors can be used to assist in detection of a cover layer on the outer surface 114. For instance, output from multiple light sensors or audio sensors can be tracked and compared to determine whether a cover layer is positioned on one or more of them. In computing device 100, two ambient light sensors 110, 112 can be included at different positions to sense light through the outer surface 114. Preferably, the sensors 110, 112 can be positioned on the device 100 in a manner that limits the likelihood that one or both of them will be obstructed by a user's hand(s) or other common obstructions such as a case or keyboard. Additionally, one of the sensors 110 may be positioned in an area of the outer surface 114 that is unlikely or unable to be covered by a screen protector, and the other sensor 112 may be positioned where it is likely to be covered by the screen protector. For example, sensor 110 can be positioned adjacent to a camera 108 (and potentially other sensors) facing through the outer surface 114 (e.g., on the same side of the device as the camera 108, within a sensor assembly that contains the camera 108, etc.). A user would not generally want to cover the camera 108 with a film or cover layer to preserve clarity of the camera, and the sensor 110 would therefore also not be covered due to its proximity to the camera 108. By comparison, the other sensor 112 can be positioned away from the camera 108 (e.g., along a different edge of the display 102) and can be positioned where it is likely to be covered by the cover layer (e.g., adjacent to the edge of the display 102). Furthermore, in some embodiments, the camera 108 itself can be used as the first light sensor instead of sensor 110.

Figure 8:
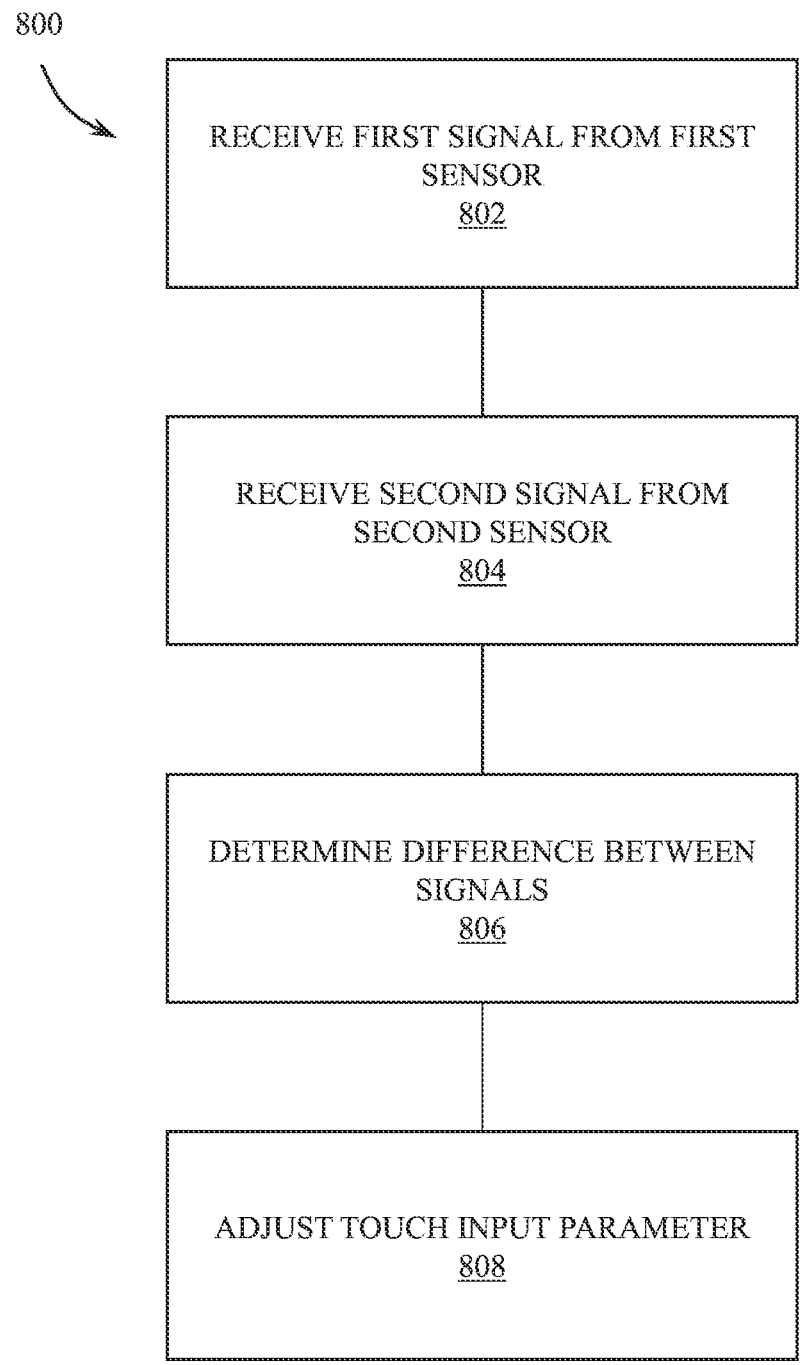
FIG. 8 shows a chart illustrating a process for detecting a cover layer and adjusting the way touch input is interpreted and used by the computing device.

Accordingly, a controller of the computing device 100 can be used to implement a method 800, as shown in FIG. 8. The method 800 can include receiving a first signal from a first sensor (e.g., 108 and/or 110) in block 802, receiving a second signal from a second sensor (e.g., 112) in block 804, determining a difference between the first and second signals in block 806, and, in block 808, adjusting a touch input parameter of a touch input device (e.g., 102) based on the difference between the first and second signals received in blocks 802 and 804.

Receiving the first and second signals from the first and second sensors, respectively, in blocks 802 and 804 can include receiving a signal from each sensor simultaneously. For example, the sensors 110, 112 can generate a signal indicative of an ambient light intensity or color at the same time. The sensors 110, 112 can be configured to measure or detect light from a common source of light, such as a light source that emits light to both sensors 110, 112 at the same time, from a substantially equal distance, at a substantially equal angle of incidence, without substantial obstructions, etc. As a result, a similar/comparable amount and color of light can be provided to both positions on the computing device 100 that correspond to the positions of the sensors 110, 112. Thus, when comparing the first and second signals in block 806, the controller/processor can make an even comparison between the signals to determine differences potentially caused by the presence of a cover layer rather than differences introduced due to other kinds of obstructions, light incidence variations, or other factors.

Determining the difference between the signals in block 806 can include detecting a color shift between the signals obtained via the two sensors 110, 112 (e.g., a difference in color balance, hue, saturation, levels, wavelength filtering, or similar light properties). The presence of a cover layer on one sensor (e.g., 112) can filter or alter light (or certain wavelengths of light) received by that sensor as compared to the uncovered sensor (e.g., 110). Empirical or theoretical data can be used to establish baseline variation levels for light intensity, color shift, etc. for each sensor so that changes in excess of those variation levels can be used as indicators of the presence of the cover layer 126. For example, as shown in FIGS. 1A and 1B, a first wavelength of light 140 can be measured by a sensor (e.g., 112) when the sensor is uncovered, and a second wavelength of light 142 can be measured when the sensor is covered by the cover layer 126. The difference in wavelengths can be indicative of the inclusion of a light filter (e.g., blue shift) caused by the cover layer 126. Similar empirical or theoretical data can be used to establish baseline variation levels for differences in audio signals for embodiments where the sensors 110, 112 are microphones or similar audio sensors or for differences in capacitance for embodiments where the sensors 110, 112 are capacitive touch sensors. The controller can identify that a cover layer is installed upon recognition that the difference between the first and second signals exceeds a threshold or lies outside of a predetermined range of expected values for a sufficient amount of time, or another difference recognition method disclosed herein can be used.

Adjusting the touch input parameter in block 808 can comprise increasing or decreasing a threshold parameter for detecting a touch input at the touch input device, such as by adjusting a minimum sensor output amplitude threshold 124, 134 (e.g., sensed voltage drop or capacitance change) at which a touch input is registerable. In some embodiments, adjusting the touch input parameter can include increasing a threshold parameter for filtering a touch input or set of touch inputs at the touch input device. For example, the controller can smooth or otherwise adjust the way that an input tap or gesture is displayed to the user (e.g., as discussed in connection with FIGS. 3A-4C) or smooth or otherwise adjust the way that the input tap or gesture has its position or intensity registered by the touch controller. Adjusting the touch input detection parameter can increase the sensitivity of the touch input device to counteract the dulling effect of increasing the distance and introducing additional (e.g., insulator) material between the touch traces and the user instrument.

In yet another aspect of the disclosure, a method can be implemented that includes combining various methods discussed elsewhere herein to generate a confidence or probability metric for whether a cover layer/screen protector is in place on the outer surface of the device. When using some of the embodiments described elsewhere herein, a probability or likelihood of a cover layer/screen protector being installed in place can be generated. This probability or likelihood is typically not at 100% confidence because, without receiving independent confirmation that a screen protector is in place (e.g., a user-provided affirmation), the sensors and touch input devices of the present disclosure generally only determine that it is likely that a screen protector is installed based on available sensor data gathered over time (e.g., using devices and methods explained above).

Figure 9:
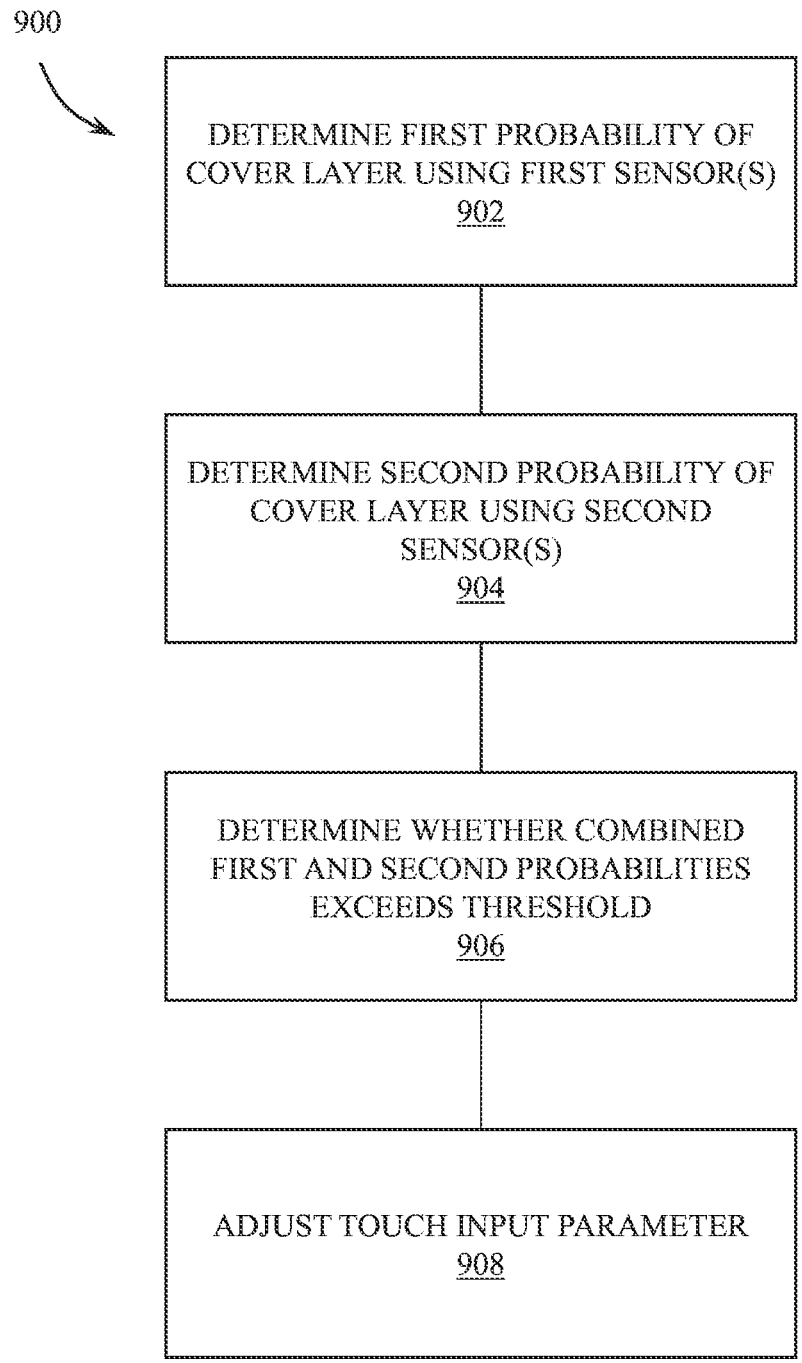
FIG. 9 shows a chart illustrating a process for detecting a cover layer and adjusting the way touch input is interpreted and used by the computing device.

Accordingly, an aspect of the disclosure relates to a method for determining whether to control or compensate for the presence of a cover layer/screen protector based on a determined likelihood or probability of the cover layer being in place. FIG. 9 shows an embodiment of the method 900 including using a first sensor to determine a likelihood of detect an indicator of a cover layer or screen protector. The method 900 can include, as shown in block 902, determining a first probability of a cover layer being installed using at least one first sensor. To do so, a controller or processor can use one of the methods described elsewhere herein (or portions thereof) to detect the cover layer using the first sensor(s). For instance, the first sensor can include at least one of: the display 102 (i.e., the touch sensor features of the display 102), a light sensor (e.g., 108, 110, 112), an audio sensor (e.g., microphone), and a non-display capacitive sensor (e.g., 606, 614, 616, 622). Depending on the type(s) of first sensor(s) used and the method used with the sensor(s) to detect the cover layer, a probability or likelihood of the cover layer being installed can be assigned. For instance, if a difference between patterns is detected using a method described in connection with blocks 202-206, a numerical value representing the difference between the patterns can be correlated with a probability that the cover layer is in position. In other words, a small difference in the two patterns can be correlated with a lower probability of a cover layer being installed, and a large difference in the patterns can be correlated with a higher probability. In some embodiments, the relationship between the difference in patterns can be linearly correlated, and in some embodiments, the relationship can be non-linearly (e.g., exponentially) correlated, depending on the type of sensor(s) used, their sensitivity, whether there are certain break points above or below which the probability of a cover layer being installed becomes more likely or not, and similar factors. Likewise, a first probability can be assigned based on a difference between characteristics (as determined in connection with block 506) or signals (as determined in connection with block 806).

In block 904, a second test or method can be used to attempt to detect a cover layer and to determine a second probability of the cover layer being in place. The second sensor(s) can be different sensor structures used as compared to the first sensor(s) (e.g., using the display 102 versus using light sensors 110, 112) or the second sensor(s) can be the same sensor structures as the first sensor(s) but used in a different way or for a different detection method. For example, different portions (e.g., 622, 624, 626) of the sensor 612 can be used for different attempts to detect the cover layer, or different detection methodologies can be implemented using the same sensor 612 (e.g., detecting a change in voltage drop/capacitance magnitude vs. detecting a change in standard deviation in the voltage drop/capacitance measurements).

In block 906, the controller can combine the first and second probabilities to produce a combined probability or overall probability of the cover layer being installed on the computing device. For example, the controller can find an average value of the first two probabilities and assign that average as the overall probability. In another example, a weighted average can be used, wherein the methodologies or sensors used to determine each of the first and second probabilities can be given a weighted value that makes them more or less significant when finding the overall probability. In some embodiments, certain methodologies and sensors can be given greater weight. For instance, methods using signals from a pair of light sensors (e.g., 110, 112) can be given greater weight than methods using the display 102 alone. Methods detecting patterns in a sensed input (e.g., as described in connection with FIGS. 3A-4C) can be given less weight than methods detecting variation in voltage drop magnitudes or capacitance change magnitudes (e.g., as described in connection with FIGS. 1A and 1B).

In block 908, the controller can adjust a touch input parameter or change an algorithm from one setting to another setting. This block can be performed using any of the operations described elsewhere herein when a cover layer has been detected on the computing device. Using multiple methods together and comparing their results can provide a more comprehensive and accurate reading on whether the cover layer is in place so that alternate algorithms and touch input parameters can be implemented or adjusted (as indicated in block 908) without unnecessarily impacting touch screen performance due to detection of false positives or false negatives.

Figure 10:
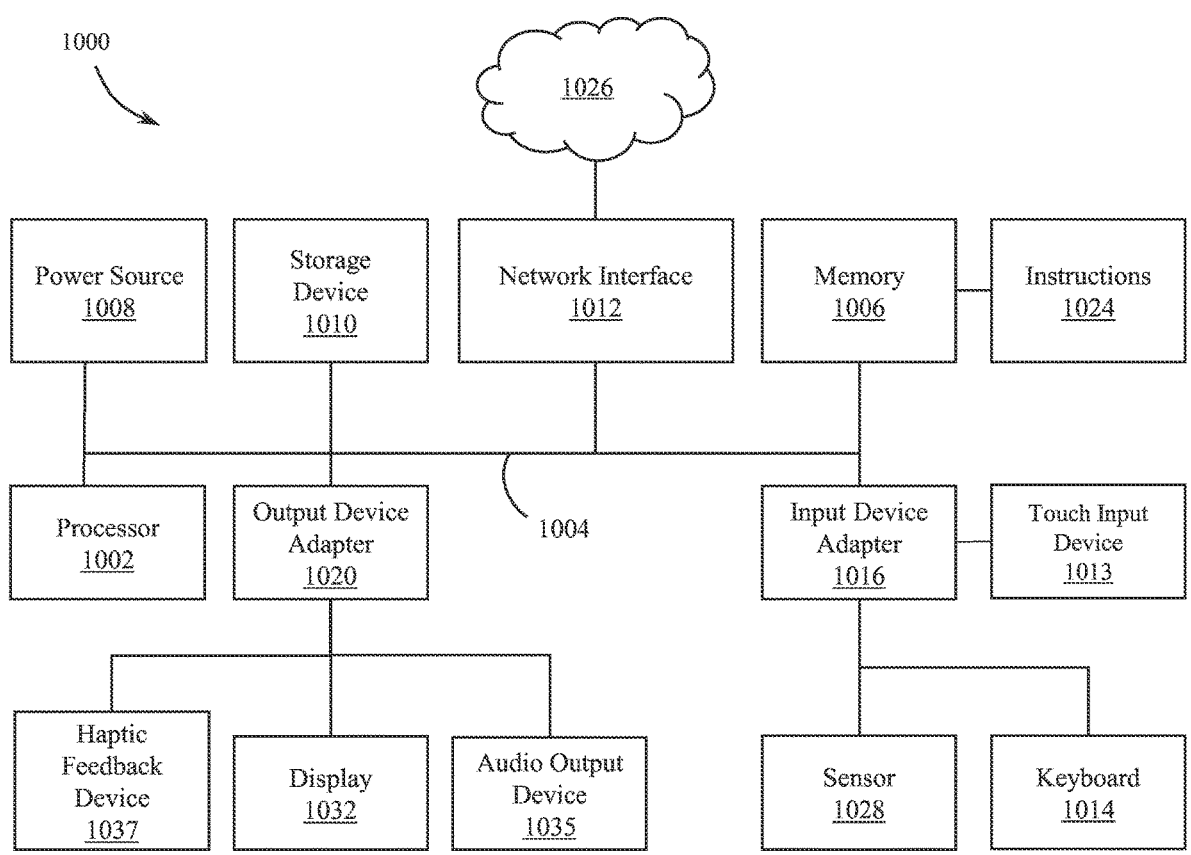
FIG. 10 shows a computer system for implementing various aspects of the present disclosure.

FIG. 10 shows a high-level block diagram of a computer system 1000 that can be used to implement embodiments of the present disclosure. In various embodiments, the computer system 1000 can comprise various sets and subsets of the components shown in FIG. 10. Thus, FIG. 10 shows a variety of components that can be included in various combinations and subsets based on the operations and functions performed by the system 1000 in different embodiments. For example, the computer system 1000 can be part of the computing devices 100, 600, 700 described above in connection with FIGS. 1, 6A, 6B, and 7. It is noted that, when described or recited herein, the use of the articles such as "a" or "an" is not considered to be limiting to only one, but instead is intended to mean one or more unless otherwise specifically noted herein.

The computer system 1000 can comprise a central processing unit (CPU) or processor 1002 connected via a bus 1004 for electrical communication to a memory device 1006, a power source 1008, an electronic storage device 1010, a network interface 1012, an input device adapter 1016, and an output device adapter 1020. For example, one or more of these components can be connected to each other via a substrate (e.g., a printed circuit board or other substrate) supporting the bus 1004 and other electrical connectors providing electrical communication between the components. The bus 1004 can comprise a communication mechanism for communicating information between parts of the system 1000.

The processor 1002 can be a microprocessor or similar device configured to receive and execute a set of instructions 1024 stored by the memory 1006. The memory 1006 can be referred to as main memory, such as random access memory (RAM) or another dynamic electronic storage device for storing information and instructions to be executed by the processor 1002. The memory 1006 can also be used for storing temporary variables or other intermediate information during execution of instructions executed by the processor 1002. The processor 1002 can include one or more processors or controllers, such as, for example, a CPU for the computing device 100 in general and a touch controller or similar sensor or I/O interface used for controlling and receiving signals from the display 102 and any other sensors being used (e.g., 108, 110, 112, 606, 614, 616). The power source 1008 can comprise a power supply capable of providing power to the processor 1002 and other components connected to the bus 1004, such as a connection to an electrical utility grid or a battery system.

The storage device 1010 can comprise read-only memory (ROM) or another type of static storage device coupled to the bus 1004 for storing static or long-term (i.e., non-dynamic) information and instructions for the processor 1002. For example, the storage device 1010 can comprise a magnetic or optical disk (e.g., hard disk drive (HDD)), solid state memory (e.g., a solid state disk (SSD)), or a comparable device.

The instructions 1024 can comprise information for executing processes and methods using components of the system 1000. Such processes and methods can include, for example, the methods described in connection with other embodiments elsewhere herein, including, for example, the methods and processes described in connection with FIGS. 2, 5, 8, and 9.

The network interface 1012 can comprise an adapter for connecting the system 1000 to an external device via a wired or wireless connection. For example, the network interface 1012 can provide a connection to a computer network 1026 such as a cellular network, the Internet, a local area network (LAN), a separate device capable of wireless communication with the network interface 1012, other external devices or network locations, and combinations thereof. In one example embodiment, the network interface 1012 is a wireless networking adapter configured to connect via WI-FI®, BLUETOOTH®, BLE, Bluetooth mesh, or a related wireless communications protocol to another device having interface capability using the same protocol. In some embodiments, a network device or set of network devices in the network 1026 can be considered part of the system 1000. In some cases, a network device can be considered connected to, but not a part of, the system 1000.

The input device adapter 1016 can be configured to provide the system 1000 with connectivity to various input devices such as, for example, a touch input device 1013 (e.g., display 102, 300, 604, or 612, or display assembly 710), a keyboard 1014 or other peripheral input device, one or more sensors 1028 (e.g., 108, 110, 112, 606, 614, 616, 722, 724, 726, 728), related devices, and combinations thereof. In an example embodiment, the input device adapter 1016 is connected to the touch input device 300 and traces 302, 304 thereof to detect a position of touches or gestures on the display. In some configurations, the input device adapter 1016 can include the touch controller or similar interface controller described above. The sensors 1028 can be used to detect physical phenomena in the vicinity of the computer system 1000 (e.g., light, sound, electric fields, forces, vibrations, etc.) and convert those phenomena to electrical signals. The keyboard 1014 or another input device (e.g., buttons or switches) can be used to provide user input such as input regarding the settings of the system 1000. In some embodiments, the input device adapter 1016 can be connected to a stylus (e.g., 118) or other input tool, whether by a wired connection or by a wireless connection (e.g., via the network interface 1012) to receive input via the touch input device 1013 and via the tool.

The output device adapter 1020 can be configured to provide the system 1000 with the ability to output information to a user, such as by providing visual output using one or more displays 1032, by providing audible output using one or more speakers 1035, or providing haptic feedback sensed by touch via one or more haptic feedback devices 1037. Other output devices can also be used. The processor 1002 can be configured to control the output device adapter 1020 to provide information to a user via the output devices connected to the adapter 1020. In some embodiments, the processor 1002 and/or output device adapter 1020 can be used to filter, curve-fit, interpolate, or smooth input provided to the touch input device 1013 based on whether a cover layer is detected, as discussed in connection with FIGS. 3A-4C.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A computing device, comprising:
    a processing device;
    a touch input device in electronic communication with the processing device; and
    a memory device in electronic communication with the processing device and having electronic instructions encoded thereon;
    wherein the electronic instructions, when executed by the processing device, cause the processing device to:
        receive a first sensed path corresponding to a first user input on the touch input device, the first sensed path including a first wave pattern;
        receive a second sensed path corresponding to a second user input on the touch input device, the second sensed path including a second wave pattern;
        determine a difference between the first wave pattern and the second wave pattern; and
        adjust an input interpretation algorithm based on the difference between the first wave pattern and the second wave pattern.

2. The computing device of claim 1, wherein the difference between the first wave pattern and the second wave pattern includes a difference in amplitude.

3. The computing device of claim 1, wherein the difference between the first wave pattern and the second wave pattern includes a difference in a peak-to-peak distance.

4. The computing device of claim 1, wherein the difference between the first wave pattern and the second wave pattern includes a difference in spatial frequency of a portion of the first wave pattern and a portion of the second wave pattern.

5. The computing device of claim 1, wherein the touch input device comprises a grid of sensor components having orthogonal primary axes, and wherein the first sensed path and the second sensed path are obtained via input provided to the touch input device along a path non-orthogonal to the primary axes of the grid of sensor components.

6. The computing device of claim 1, wherein adjusting the input interpretation algorithm comprises increasing sample input data used by the input interpretation algorithm.

7. A computing device, comprising:
a processing device;
a housing having an outer face;
a touch input device in electronic communication with the processing device and configured to sense capacitive touch input through the outer face;
a first sensor in electronic communication with the processing device, the first sensor positioned at a first location on the housing;
a second sensor in electronic communication with the processing device, the second sensor positioned at a second location on the housing separate from the first location;
a memory device in electronic communication with the processing device and having electronic instructions encoded thereon, wherein the electronic instructions, when executed by the processing device, cause the processing device to:
receive a first signal obtained from the first sensor, the first signal having a first signal characteristic;
receive a second signal obtained from the second sensor, the second signal having a second signal characteristic;
detect a difference between the first and second signal characteristics indicative of the first location being covered by a cover layer external to the housing and of the second location not being covered by the cover layer; and
adjust a touch input threshold of the touch input device based on the difference between the first and second signal characteristics.

8. The computing device of claim 7, wherein the first sensor includes an audio sensor.

9. The computing device of claim 7, wherein the first sensor includes a proximity sensor.

10. The computing device of claim 7, wherein the first sensor includes a capacitance sensor separate from the touch input device.

11. The computing device of claim 7, wherein the difference includes an amplitude.

12. The computing device of claim 7, wherein adjusting the touch input threshold includes increasing sensitivity of the touch input device to detect capacitive touch input.

13. A computing device, comprising:
a processing device in electronic communication with:
a touch input device positioned in a body;
a first sensor positioned at a first location on the body adjacent the touch input device; and
a second sensor positioned at a second location on the body, the second location being different than the first location; and
a memory device in electronic communication with the processing device and having electronic instructions encoded thereon, wherein the electronic instructions, when executed by the processing device, cause the processing device to:
receive a first signal from the first sensor;
receive a second signal from the second sensor;
determine a difference between the first signal and the second signal; and
adjust a touch input parameter of the touch input device based on the difference between the first signal and the second signal.

14. The computing device of claim 13, wherein adjusting the touch input parameter comprises decreasing a threshold parameter for detecting a touch input at the touch input device.

15. The computing device of claim 13, wherein adjusting the touch input parameter comprises increasing a threshold parameter for curve-fitting a touch input at the touch input device.

16. The computing device of claim 13, wherein the electronic instructions further cause the processing device to simultaneously obtain the first signal and the second signal from the first light sensor and the second light sensor, respectively.

17. The computing device of claim 13, wherein the difference between the first signal and the second signal includes a difference in a property of sound sensed by the first sensor relative to the second sensor.

18. The computing device of claim 13, wherein the difference between the first signal and the second signal includes a difference in amplitude sensed by the first sensor relative to the second sensor.

19. The computing device of claim 13, wherein adjusting the touch input detection parameter comprises increasing a sensitivity setting of the touch input device.

20. The computing device of claim 13, wherein the first location is positioned to be covered by a cover layer, and the second location is positioned to not be covered by the cover layer.

* * * * *